US012638662B2

(12) United States Patent
Ivanov et al.

(10) Patent No.: US 12,638,662 B2
(45) Date of Patent: May 26, 2026

(54) CAMERA WITH TILTABLE OPTICAL FIELD OF VIEW CHANGING ELEMENTS

(71) Applicant: Samsung Electronics Co., Ltd., Suwon-si (KR)

(72) Inventors: Stepan Evgenievich Ivanov, Saint Petersburg (RU); Elena Gennadievna Malinovskaya, Moscow (RU); Andrey Alexandrovich Manko, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 282 days.

(21) Appl. No.: 18/095,143

(22) Filed: Jan. 10, 2023

(65) Prior Publication Data

US 2023/0236393 A1    Jul. 27, 2023

(30) Foreign Application Priority Data

Jan. 10, 2022    (RU) ................................ 2022100079
Oct. 26, 2022    (KR) ........................ 10-2022-0139595

(51) Int. Cl.
G02B 13/00        (2006.01)
G02B 26/08        (2006.01)
(Continued)

(52) U.S. Cl.
CPC ..... G02B 13/0065 (2013.01); G02B 26/0816 (2013.01); G02B 27/0081 (2013.01);
(Continued)

(58) Field of Classification Search
CPC ............ G02B 13/0065; G02B 26/0816; G02B 27/0081; G02B 3/0056; G03B 30/00;
(Continued)

(56) References Cited

U.S. PATENT DOCUMENTS 9,383,550 B2    7/2016  Osborne
9,398,264 B2    7/2016  Georgiev et al.
(Continued)

OTHER PUBLICATIONS

Conor J. Sheil et al., "Double-folded catadioptric lens for smartphone portraiture photography," *Optical Design and Engineering VII*, edited by Laurent Mazuray et al., Proceedings of SPIE vol. 10690, pp. 106900O-1 to 106900O-6, Jun. 5, 2018, SPIE, Bellingham, Washington, conference held May 14-17, 2018, Frankfurt, Germany, paper 10690-19 presented on May 15, 2018, https://doi.org/10.1117/12.2310091.
(Continued)

*Primary Examiner* — Nhan T Tran
(74) *Attorney, Agent, or Firm* — NSIP Law

(57)        ABSTRACT

An optical assembly of an imaging device includes an array of lens assemblies each having a double-folded optical axis, and an image sensor. Each of the lens assemblies each having the double-folded optical axis includes an input optical axis folding element, at least one lens having an optical power, and an output optical axis folding element. The input optical axis folding element of each of the lens assemblies having the double-folded optical axis is configured to change a field of view (FOV) of the input optical axis folding element by changing an optical axis folding angle of the input optical axis folding element about two axes.

20 Claims, 5 Drawing Sheets

(51) Int. Cl.

| | | |
|---|---|---|
| *G02B 27/00* | (2006.01) |
| *G03B 30/00* | (2021.01) |
| *H04N 23/55* | (2023.01) |
| *H04N 23/58* | (2023.01) |
| *G02B 3/00* | (2006.01) |

(52) U.S. Cl.

CPC ............. *G03B 30/00* (2021.01); *H04N 23/55* (2023.01); *H04N 23/58* (2023.01); *G02B 3/0056* (2013.01)

(58) Field of Classification Search

CPC ........ G03B 17/17; H04N 23/55; H04N 23/58; H04N 23/45

See application file for complete search history.

(56) References Cited

U.S. PATENT DOCUMENTS

| | | | |
|---|---|---|---|
| 9,858,013 | B1 | 1/2018 | Srivastav et al. |
| 10,182,216 | B2 | 1/2019 | Mullis et al. |
| 10,366,472 | B2 | 7/2019 | Lelescu et al. |
| 11,064,116 | B2 | 7/2021 | Adsumilli et al. |
| 11,086,099 | B2 | 8/2021 | Lim et al. |
| 11,245,827 | B2 | 2/2022 | Park et al. |
| 2014/0111650 | A1* | 4/2014 | Georgiev ............. H04N 23/698 |
| | | | 348/159 |
| 2015/0288865 | A1* | 10/2015 | Osborne ............ G02B 13/0085 |
| | | | 359/823 |
| 2015/0319368 | A1* | 11/2015 | Cheng .............. H01L 27/14601 |
| | | | 348/240.3 |
| 2015/0373262 | A1* | 12/2015 | Georgiev ............... G03B 17/17 |
| | | | 29/428 |
| 2017/0075092 | A1* | 3/2017 | Kim ..................... H04N 23/667 |
| 2020/0057310 | A1 | 2/2020 | Wippermann et al. |
| 2020/0241233 | A1 | 7/2020 | Shabtay et al. |
| 2020/0341290 | A1 | 10/2020 | Chan et al. |
| 2021/0041765 | A1* | 2/2021 | Shigemitsu ........ G02B 13/0065 |
| 2021/0132465 | A1 | 5/2021 | Shabtay et al. |
| 2021/0348947 | A1* | 11/2021 | Yedid ..................... G03B 37/02 |
| 2024/0077356 | A1* | 3/2024 | Yuce ..................... G01J 3/0256 |

OTHER PUBLICATIONS

Russian Office Action Issued on Jan. 10, 2022, in Counterpart Russian Patent Application No. 2022100079 (2 Pages in English, 2 Pages in Russian).

\* cited by examiner

CAMERA WITH TILTABLE OPTICAL FIELD OF VIEW CHANGING ELEMENTS

CROSS-REFERENCE TO RELATED APPLICATIONS

This application claims the benefit under 35 USC 119(a) of Russian Patent Application No. 2022100079 filed on Jan. 10, 2022, in the Russian Federal Service for Intellectual Property, and Korean Patent Application No. 10-2022-0139595 filed on Oct. 26, 2022, in the Korean Intellectual Property Office, the entire disclosures of which are incorporated herein by reference for all purposes.

BACKGROUND

1. Field

The following description relates to an optical system of an image capturing lens to be used in an imaging device (a camera) of an electronic device, such as a compact computing device.

2. Description of Related Art

With the advent of compact electronic computing devices, including, but not limited to, mobile phones, smartphones, tablet computers, personal digital assistants (PDAs), communicators, netbooks, and laptops, there is a demand for such devices provided with devices for capturing images, such as photo/video cameras, as means to implement various functions related to still and video image capture, video communication, user face recognition, and computer vision, executed by a command from a user.

These devices may generally capture high-resolution images. The resolution of a high-resolution image from an optical device may be determined by two parameters, which are image sensor resolution and optical system resolution. These two features may need to be adjusted to allow a sensor to capture an image. In an optics context, to adjust these values, a sampling theorem (Nyquist frequency) is generally used according to Equation 1 below.

$$d_{spot} = \frac{2}{f_{sensor}} = 2 \, pix \tag{1}$$

In Equation 1, $d_{spot}$ denotes a blur spot diameter, $f_{sensor}$ denotes a sensor frequency, and pix denotes a pixel size of the sensor.

To be able to provide a device that is compact, it may be necessary to use a small high-resolution sensor. Due to its small size and high resolution (a large number of pixels >50 million (M)), a size of a pixel may be as small as 0.6 to 1.4 micrometers (μm). As shown in Equation 1, a blur spot to be generated in an optical system may also need to be very small. A blur spot of the optical system may have a geometric component and a diffraction component.

The geometric component may vary depending on an optical aberration provided by a structure of the optical system, that is, a shape of an optical element, an arrangement of optical elements, and optical materials. The structure may be determined in an optical calculation step according to a known method for synthesis and optimization of the optical system.

The diffractive component may vary depending on an f-number of the optical system and may be selected before optical calculation starts based on a desired minimum blur spot size according to Equation 2 below.

$$d_{spot} = 1.22 \cdot \lambda \cdot F\# \tag{2}$$

In Equation 2, $d_{spot}$ denotes a diffraction blur spot diameter, $\lambda$ denotes a wavelength, and F #denotes an f-number of the optical system.

Thus, one of the main parameters of the optical system for achieving a high resolution is an f-number.

Also, the need to change (zoom) a field of view of such lenses has arisen. Conventional lenses for photo cameras in which zooming (a change in a field of view) is implemented by moving elements, such as lenses and lens groups, are not suitable for use in compact computing devices due to their large dimensions.

As is known in the field of variable focus lenses, in order to implement a change in a field of view (hereinafter referred to in short form as FOV), one needs to either provide one or more moving optical system components to physically change the focal length of a lens, or to use several lenses or cameras, each having its own focal length, and switching between them as necessary, the switching being controlled by software, while providing seamless switching between the lenses (cameras), if possible, without making abrupt changes in the lenses (cameras) a user may notice.

A lens with movable optical system components may need a very highly precise optical system assembly and highly precise structural elements that may provide the necessary tolerances in the optical system throughout the range of variable focal length values. A combined variant may also be possible, where several switchable lenses or cameras may be used to cover the whole necessary range of focal distances, each of which uses a group of moving optical system elements.

At present, lens assemblies are suggested that include at least one optical element that enables the lens assembly to be folded by at least one deflection of an optical axis of the lens assembly. Such lens assemblies may be characterized as folded (at least once) lens assemblies.

Reference US 2020/0241233 A1 (Corephotonics Ltd., published on Jul. 30, 2020) describes an optical lens module for a digital camera, wherein the optical module may include a lens system, a scanning reflective element, an image sensor, and a controller that controls the scanning reflective element to scan an area of a scene that corresponds to a desired magnification (zoom) factor and captures a plurality of partially overlapping long focal length images. The scanning reflective element may be arranged at an angle of about 45 degrees relative to the incident light so that a lens system may be arranged not in a thickness direction of a device, but in a longitudinal or lateral direction of the device. This solution affects the quality of a resulting image and the use of cameras using optical modules because an area of a scene needs to be scanned by the scanning reflective element, increasing an exposure time. Furthermore, in this solution, an image sensor may be arranged in the thickness direction of the device to which this solution is applied, which limits a possible size of the image sensor and a resulting resolution.

Reference US 2020/0341290 A1 (Apple Inc., published on Oct. 29, 2020) discloses an imaging device that may include an image sensor and a zoom lens assembly including a plurality of movable lens elements arranged to move independently of one another to change (zoom) a focal length. The imaging device may also include a mirror assembly including a mirror for folding an optical axis of imaging device and an actuator configured to tilt the mirror for optical image stabilization.

Reference US 2021/0041765 (Apple Inc., published on Feb. 11, 2021) discloses an optical assembly for an imaging device including two optical elements to fold an optical axis (e.g., prisms or mirrors) of the imaging device. Using the optical assembly may allow an image sensor of the imaging device to be arranged so that it is not arranged in a thickness direction of a device using the imaging device.

Reference "Double-folded catadioptric lens for smartphone portraiture photography" (National University of Ireland, Galway, doi.org/10.1117/12.2310091, 2018) discloses a camera for a smartphone including a lens having a large entrance pupil diameter and a low f-number. This lens is a double-folded catadioptric lens with an overall lens thickness of approximately 5 mm and an overall optical path length of 13.2 mm or 17.4 mm. One of the reflective components of the double-folded lens is implemented as a freeform lens with a specific optical power to correct geometric aberrations and achieve a desired focal length. A moving optical component inside the lens is used for zooming as in conventional lenses. However, since this movable optical component also participates in aberration correction, the range of possible focal lengths is small, and a relatively narrow field of view of the optical assembly is achieved. Moreover, maintaining a sufficiently high resolution over the full range of focal lengths and fields of view available in conventional optical assemblies is quite problematic.

US 2020/0241233 A1, US 2020/0341290 A1, US 2021/0041765, and "Double-folded catadioptric lens for smartphone portraiture photography" are incorporated herein by reference.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a optical assembly of an imaging device includes an array of lens assemblies each having a double-folded optical axis; and an image sensor, wherein each of the lens assemblies each having the double-folded optical axis includes an input optical axis folding element, at least one lens having an optical power, and an output optical axis folding element, and the input optical axis folding element of each of the lens assemblies each having the double-folded optical axis is configured to change a field of view (FOV) of the input optical axis folding element by changing an optical axis folding angle of the input optical axis folding element about two axes.

The at least one lens having the optical power may be a group of lenses each having a respective optical power and a common optical axis.

The image sensor may be disposed on a plane that is substantially parallel to the common optical axis of the group of lenses.

The array of lens assemblies each having the double-folded optical axis may be a 2×2 array, and each of the lens assemblies each having the double-folded optical axis may be disposed so that an output surface of the output optical axis folding element faces the image sensor.

Each of the input optical axis folding element and the output optical axis folding element may include a prism or a flat mirror.

Each of the input optical axis folding element and the output optical axis folding element may include a flat optical surface or a curved optical surface.

The output optical axis folding element may be disposed at a fixed position.

The input optical axis folding element may include an actuator configured to tilt the input optical axis folding element about either one or both of an x-axis and a z-axis independently to change the optical axis folding angle about the two axes.

The at least one lens having the optical power may be a group of lenses including one or more refractive optical elements configured to provide the optical power.

The input optical axis folding element may include a nematic liquid crystal (NLC) light deflector configured to change the optical axis folding angle of the input optical axis folding element about the two axes.

The optical axis folding angle may be substantially 90 degrees in each of the input optical axis folding element and the output optical axis folding element.

In another general aspect, an imaging method in an imaging device including an array of lens assemblies each having a double-folded optical axis, each of the lens assemblies including an input optical axis folding element, at least one lens having an optical power, and an output optical axis folding element, the imaging device further including an image sensor, the imaging method including inputting incident light from a scene to be imaged into the array of lens assemblies each having the double-folded optical axis through the input optical axis folding element of each of the lens assemblies; transmitting the light that has passed through the input optical axis folding element of each of the lens assemblies through the least one lens having an optical power of each of the lens assemblies; outputting the light that has passed through the at least one lens of each of the lens assemblies to the image sensor through an output optical axis folding element of each of the lens assemblies to generate a field of view (FOV) channel for each of the lens assemblies in the image sensor; and changing an optical axis folding angle of the input optical axis folding element of one or more of the lens assemblies to change the FOV of each of the one or more lens assemblies, wherein an optical axis of the incident light is folded twice by the input optical axis folding element and the output optical axis folding element of each of the lens assemblies having the double-folded optical axis.

The changing of the optical axis folding angle may include tilting the input optical axis folding element of the one or more of the lens assemblies about either one or both of an x-axis and a z-axis independently.

The input optical axis folding element of each of the lens assemblies may include a nematic liquid crystal (NLC) light deflector, and the changing of the optical axis folding angle may include controlling the NLC light deflector to change the optical axis folding angle of the input optical axis folding element of each of the one or more of the lens assemblies.

The imaging method may further include partially or fully overlaying the FOV channels generated in the image sensor by the lens assemblies of the array of lens assemblies each having the double-folded optical axis to obtain a resulting image.

The optical axis of the incident light may be changed by substantially 90 degrees by each of the input optical axis folding element and the output optical axis folding element of each of the lens assemblies.

In another general aspect, an imaging device includes an image sensor including an imaging surface; and an array of lens assemblies configured to form an array of images on the imaging surface of the image sensor, wherein at least one lens assembly of the lens assemblies includes an input optical axis folding element configured to fold an optical axis of the lens assembly in a first direction; an output optical axis folding element configured to fold the optical axis of the lens assembly in a second direction different from the first direction and including an output surface facing the image sensor; and at least one lens having an optical power disposed between the input optical axis folding element and the output optical axis folding element, and the input optical axis folding element of each of the at least one lens assembly is configured to change a field of view (FOV) of the input optical axis folding element by changing an optical axis folding angle of the input optical axis folding element in two directions.

The input optical axis folding element may include an input surface configured to receive incident light from a scene to be imaged by the imaging device, and an output surface facing an input surface of the at least one lens, and the output optical axis folding element may include an input surface facing an output surface of the at least one lens, and an output surface facing the image sensor.

The imaging surface of the image sensor may be substantially parallel to an optical axis of the at least one lens.

The array of lens assemblies may a 2×2 array of lens assemblies, and all of the lens assemblies of the 2×2 array of lens assemblies may include the input optical axis folding element, the output optical axis folding element, and the at least one lens, or the array of lens assemblies may be a 3×3 array of lens assemblies, all of the lens assemblies of the 3×3 array of lens assemblies except a central lens assembly among the 3×3 array of lens assemblies may include the input optical axis folding element, the output optical axis folding element, and the at least one lens, and the central lens assembly may include the at least one lens but may not include the input optical axis folding element and the output optical axis folding element.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
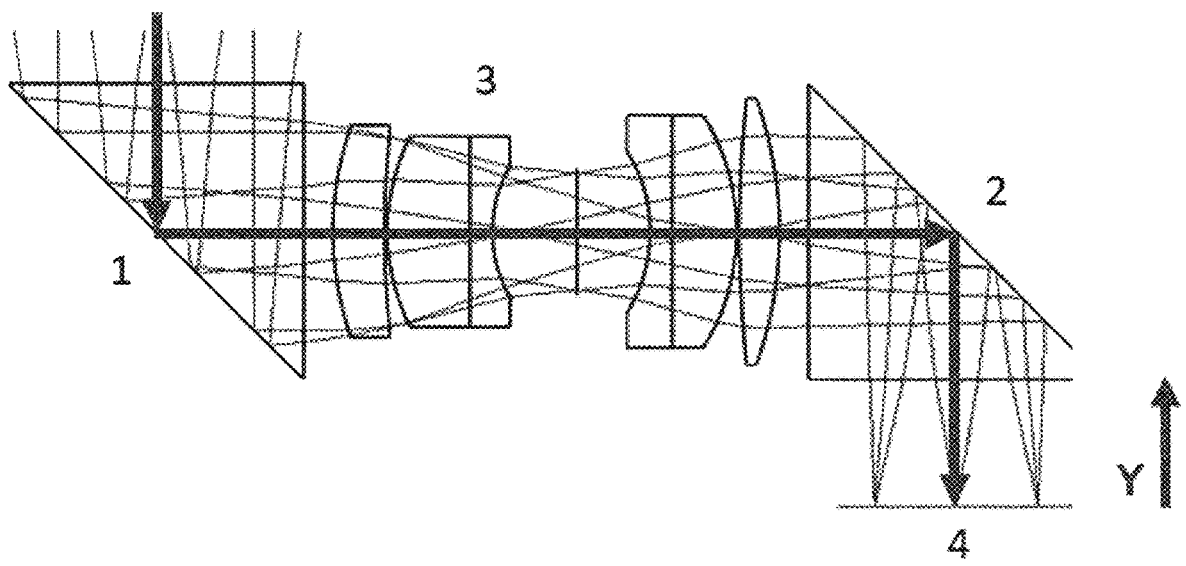
FIG. 1 illustrates a schematic diagram of a assembly having a double-folded optical axis.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The present disclosure is based on use of an optical element with a double-folded optical path (optical axis) for image generation. In the present disclosure, folding (reflection) of an optical axis of incident light is implemented by an optical axis folding element, and more particularly by an input optical axis folding element and an output optical axis folding element in each of lens assemblies included in an array. Thereby, a double-folded optical system is created.

In a first aspect, an optical assembly for an imaging device based on the use of an array of lens assemblies each having a double-folded optical axis is provided. Each of the lens assemblies included in the array of lens assemblies may have an input optical axis folding element and an output optical axis folding element to fold (reflect) an optical axis. In a non-limiting example, the input and output optical axis folding elements may be implemented in a form of a prism or a mirror and have flat or curved optical surfaces. In a non-limiting example, each of the input and output optical axis folding elements may implement reflection (rotation) of an optical axis of incident light by substantially 90 degrees.

Each of the lens assemblies included in the array of lens assemblies each having the double-folded optical axis may generate its own FOV channel in an image sensor. Each FOV channel may generate an image in a corresponding portion of an image sensor surface, which is substantially a compound eye vision (CEV) camera.

As described above, each of the lens assemblies included in the array of lens assemblies each having the double-folded optical axis may include the input optical axis folding element. The input element may be configured to tilt about at least two axes, an x-axis and a z-axis. It should be noted that each of the lens assemblies included in the array of lens assemblies each having the double-folded optical axis may be configured to tilt the input element about either one or both of the x-axis and the z-axis independently, and for this purpose, at least one individual actuator is provided for each of the lens assemblies. A direction of each FOV channel may be changed (rotated) by tilting the input optical axis folding element.

In one or more examples, the optical assembly according to the present disclosure may provide at least two operation modes.

A first mode (referred to as a co-directional mode) in which an FOV of every channel implemented by each of the lens assemblies included in the array of lens assemblies each having the double-folded optical axis has a same (one common) direction may be provided. The first mode may be implemented by equally tilting every input optical folding element of the array of lens assemblies about either one or both of the x-axis and the z-axis.

A second mode ((referred to as a differently directed mode) in which an input optical axis folding element of each of the lens assemblies included in the array of lens assemblies tilts about either one or both of the x-axis and the z-axis independently of the other lens assemblies may be provided. In the second mode, an FOV of a channel implemented by each of the lens assemblies included in the array of lens assemblies may have a different direction.

Generation of a resulting image obtained by combining an FOV channel of each of the lens assemblies in the array of lens assemblies each having the double-folded optical axis in the image sensor may be implemented using a known appropriate software algorithm.

Thus, in the first mode, an FOV of the resulting image generated in the image sensor by superimposing the FOV channels of the lens assemblies included in the array of lens assemblies may correspond to an FOV of a zoom lens, wherein the FOV is narrower and has a long focal length, and in the second mode, an FOV of the resulting image may correspond to an FOV of a wide-angle lens, wherein the FOV is wider and has a short focal length.

This may be achieved because, depending on orientations of the input optical axis folding elements on which light from an observed scene is incident, each of the lens assemblies of the array of lens assemblies each having the double-folded optical axis generates an image in which a portion of the observed scene is captured, wherein the image has an FOV identical to the FOVs of the other channels (the first mode), or has an FOV that is different from the FOVs of the other channels (the second mode). Therefore, in the first mode, FOV channels of the lens assemblies may be substantially completely superimposed so that a post-processing algorithm may generate a resulting image with a high resolution and a narrower FOV, and in the second mode, FOV channels of the lens assemblies may partially overlap so that each part of the observed scene may be stitched together into a resulting image with a wider FOV.

An example of the present disclosure may use the array of lens assemblies each having the double-folded optical axis. As illustrated in FIG. 1, a lens assembly having a double-folded optical axis includes an input optical axis folding optical element 1, a group 3 of lenses having an overall optical power, and an output optical axis folding element 2. In addition, FIG. 1 schematically illustrates an image sensor 4. In FIG. 1, bold arrows schematically show a path of light passing through the lens assembly having the double-folded optical axis.

In a non-limiting example, an operating principle of the lens assembly having the double-folded optical axis is that incident light from an observed scene is incident on the input optical axis folding optical element 1, where the incident light is reflected so that a light propagation angle changes by substantially 90 degrees (a first optical axis reflection). In a non-limiting example, the light may pass through the group 3 of lenses having the overall optical power, wherein the lenses may be one or more refractive lenses each having a respective optical power, like in an optical system of an existing lens. The group 3 of lenses having the overall optical power may transform a planar wavefront of light incident on the group 3 of lens from the input optical axis folding optical element 1 into a convergent wavefront of light to focus the light onto the image sensor 4 to generate an image. The group 3 of lenses may be designed to have a low f-number, which allows a blur spot to be small enough in size to fit a compact high-resolution image sensor. After passing through the group 3 of lenses having the overall optical power, the light may reach the output optical axis folding element 2, where the light may be reflected again at an angle (in a non-limiting example, light may be reflected again at an angle of substantially 90 degrees (a second optical axis reflection)), and the reflected light may reach from the lens assembly to a plane of the image sensor 4 on which an FOV channel corresponding to the lens assembly is formed. Thus, in the above-described configuration of the lens assembly having the double-folded optical axis, the plane of the image sensor 4 may be substantially parallel to a plane of an imaged object and may not be rotated by 90 degrees with respect to the plane of the imaged object as discussed above.

Figure 2:
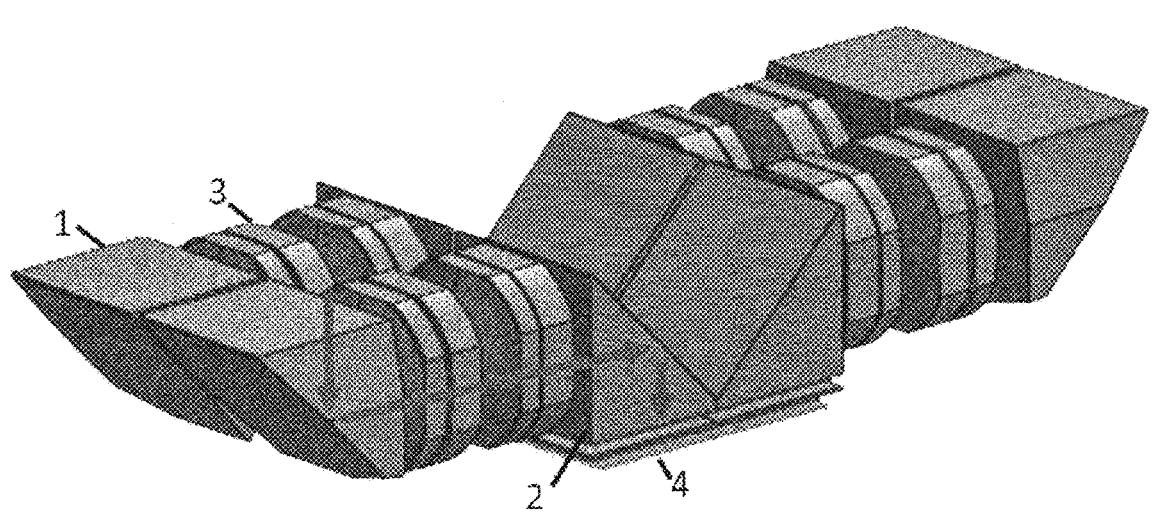
FIG. 2 schematically illustrates an example of an optical assembly including a 2×2 array of lens assemblies each having a double-folded optical axis.

FIG. 2 schematically illustrates an example of an optical assembly with a 2×2 array of lens assemblies each having a double-folded optical axis. The array may provide a compound optical system with a compound FOV based on one common image sensor. As illustrated in FIG. 2, all of the lens assemblies included in the array of lens assembles each having the double-folded optical axis may be arranged so that the output optical axis folding element 2 may face the common image sensor 4. Each of the lens assemblies of the array of lens assemblies each having the double-folded optical axis may generate its own FOV channel, and all of the FOV channels may be mapped on a plane of the image sensor 4, which is a CEV camera that provides a resulting compound FOV by combining the FOV channels.

In the first operation mode of the optical assembly, which is characterized in the above description, images of the respective FOV channels may be identical and may depict a same portion of the observed scene. Based on a technique of combining images through appropriate software processing of these FOV channels, a very high-resolution (super-resolution) resulting image may be provided, which depicts a relatively narrow area of the observed scene, similar to the result of using a zoom lens with a long focal length. Non-limiting examples of possible techniques of combining images through software processing may include techniques disclosed in U.S. Pat. No. 10,366,472 B2 entitled "Systems and Methods for Synthesizing High Resolution Images Using Images Captured by an Array of Independently Controllable Imagers", and U.S. Pat. No. 10,182,216 B2 entitled "Extended Color Processing on Pelican Array Cameras". U.S. Pat. Nos. 10,366,472 B2 and 10,182,216 B2 are incorporated herein by reference.

In the second operation mode of the optical assembly, images of each of the FOV channels are different and correspond to different portions of the observed scene that are located close to each other and substantially have no gaps between each other. When the images are combined by appropriate software processing to stitch these FOV channels together, a high-resolution image may be obtained, which depicts a wide area of the observed scene, similar to the result of using a wide-angle lens with a shorter focal length. A non-limiting example of a technique of stitching images together by software processing may include a technique disclosed in U.S. Pat. No. 11,064,116 B2 entitled "Image Stitching in a Multi-Camera Array". U.S. Pat. No. 11,064,116 is incorporated herein by reference.

An example in which the array of lens assemblies each having the double-folded optical axis is a 2×2 array is described with reference to FIG. 2. It should be understood that the scope of the present disclosure is not limited by the configuration of the array of lenses, and a non-limiting example may use other arrays, such as 2×3, 3×2, and 3×3 arrays. The 2×2 array may be a smallest array suitable for an actual implementation of the present disclosure.

Figure 3:
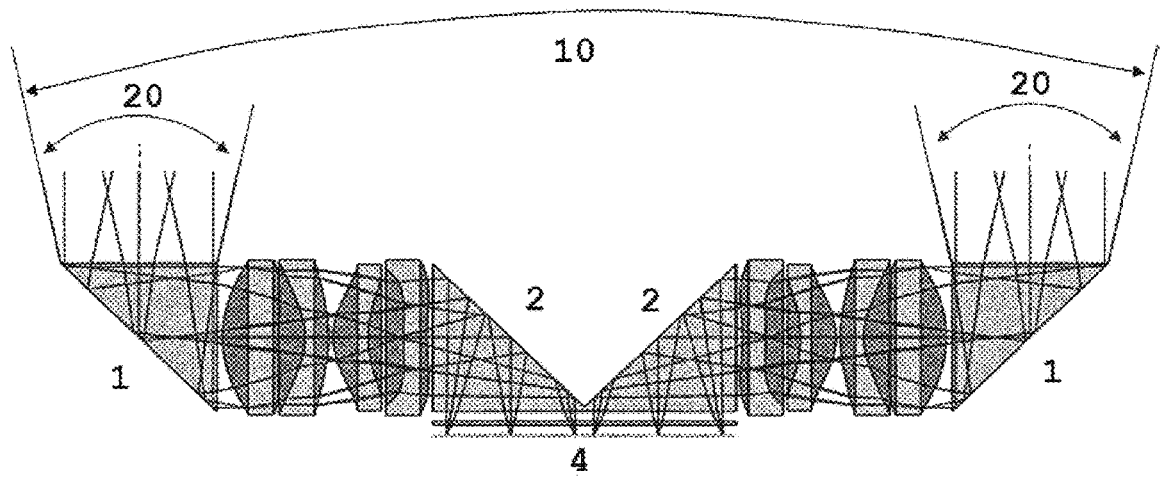
FIG. 3 schematically illustrates a common field of view (FOV) generated from FOV channels of lens assemblies included in an array of lens assemblies each having a double-folded optical axis of an optical assembly when the FOV channels are superimposed.
Figure 4:
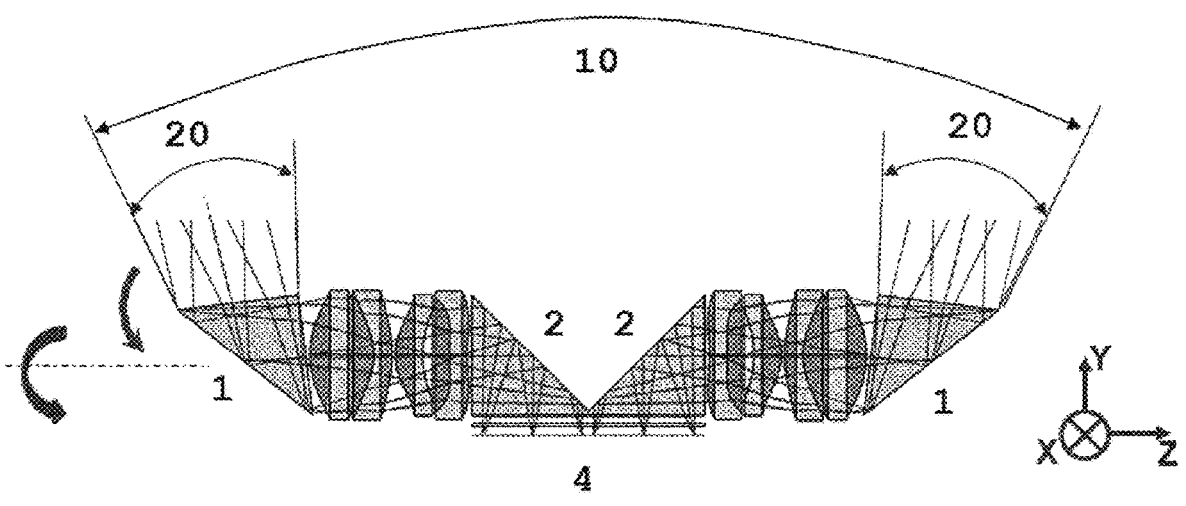
FIG. 4 schematically illustrates a common FOV generated from FOV channels of lens assemblies included in an array of lens assemblies each having a double-folded optical axis of an optical assembly when the FOV channels are partially overlaid.

FIGS. 3 and 4 illustrate examples of a common FOV 10 generated from FOV channels of lens assemblies included in an array of lens assemblies each having a double-folded optical axis of an optical assembly. As illustrated in FIG. 4, an x-axis and a z-axis may be designated, about which the input optical axis folding element 1 may tilt. FIG. 3 illustrates the common FOV 10 including a plurality of FOV channels 20 of the lens assemblies, wherein the common FOV 10 may correspond to an FOV of a zoom lens (a narrow FOV, a zoom FOV) with a long focal length. In this example, FOVs of the lens assemblies included in the array may provide images that are substantially the same, and a very high-resolution resulting image with a narrow FOV may be provided by superimposing these images. In other words, the common FOV 10 may be identical to the FOV channels 20 of the lens assemblies.

FIG. 4 illustrates that the input optical axis folding element 1 tilts at least about an x-axis compared to the optical axis folding element 1 shown in FIG. 3. The common FOV 10 may be implemented in a configuration of FIG. 4. The common FOV 10 may be generated by stitching together images corresponding to the FOV channels 20 of the lens assemblies, wherein the lens assemblies may capture a portion of a whole of an observed scene. Accordingly, a wider FOV (a wide-angle FOV) may be generated. In this example, the common FOV 10 may include combinations of the FOV channels 20 of all the lens assemblies included in the array of lens assemblies.

Figure 5:
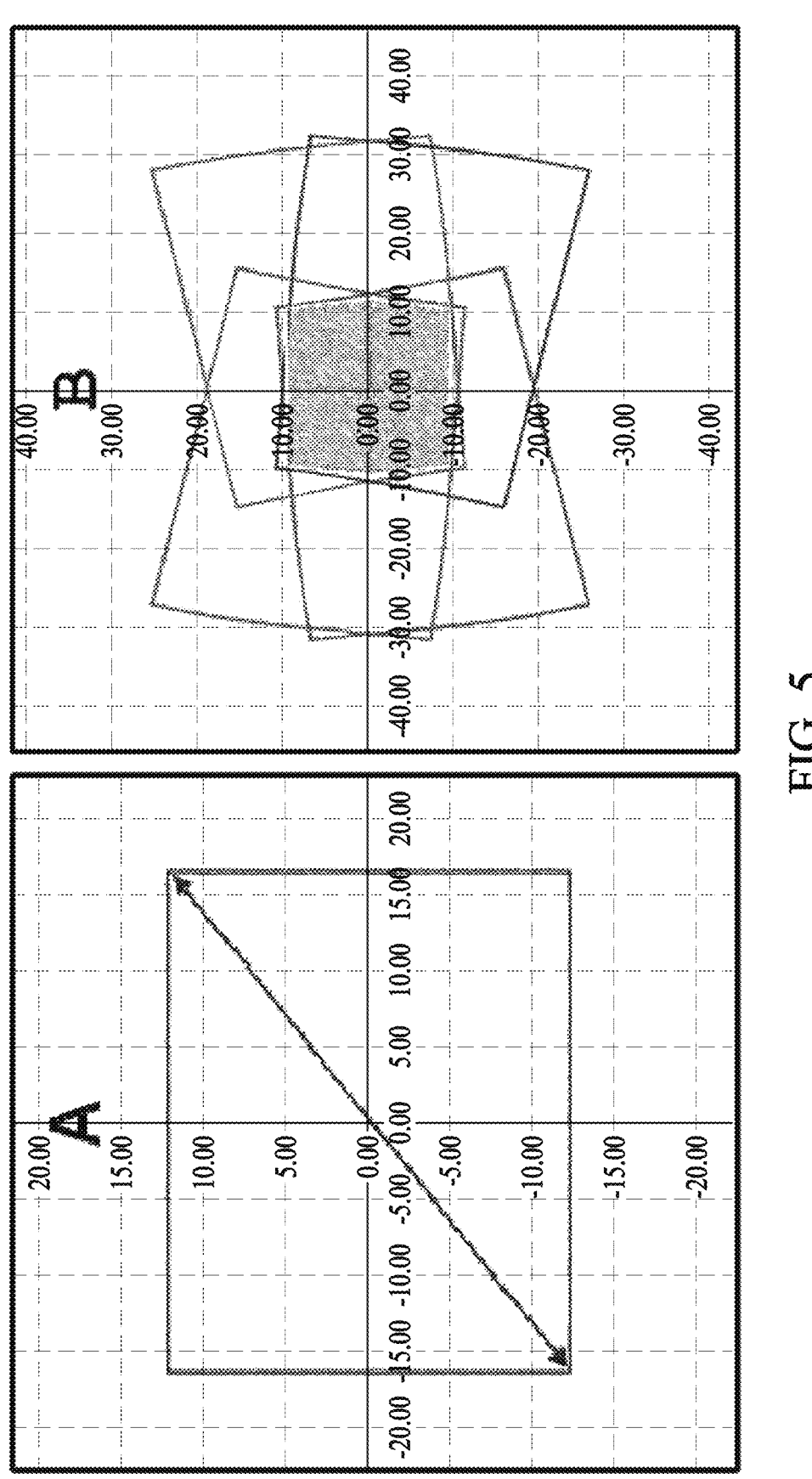
FIG. 5 schematically illustrates mapping of FOV channels of lens assemblies included in an array of lens assemblies each having a double-folded optical axis on an image sensor plane for a first mode (view A) and a second mode (view B).

View A and view B of FIG. 5 schematically illustrate mapping of an FOV of each of the lens assemblies included in an array of lens assemblies each having a double-folded optical axis on an image sensor plane for a first mode (view A) and a second mode (view B). An arrow in view A indicates a diagonal of a resulting image area obtained as a result of processing overlapping FOVs of different channels. As illustrated in view A, when all lens assemblies of the array generate FOV channels that are identical, FOVs of the lenses may completely overlap with each other. As illustrated in view B, each of the FOV channels may correspond to one of different areas of the image sensor plane. The areas may be arranged at different angles, and at least partially overlap (be superimposed) with each other. An image corresponding to a common FOV of the array of lens assemblies may be generated from the FOV channels of the array of lens assemblies using a software algorithm for image stitching.

Figure 6:
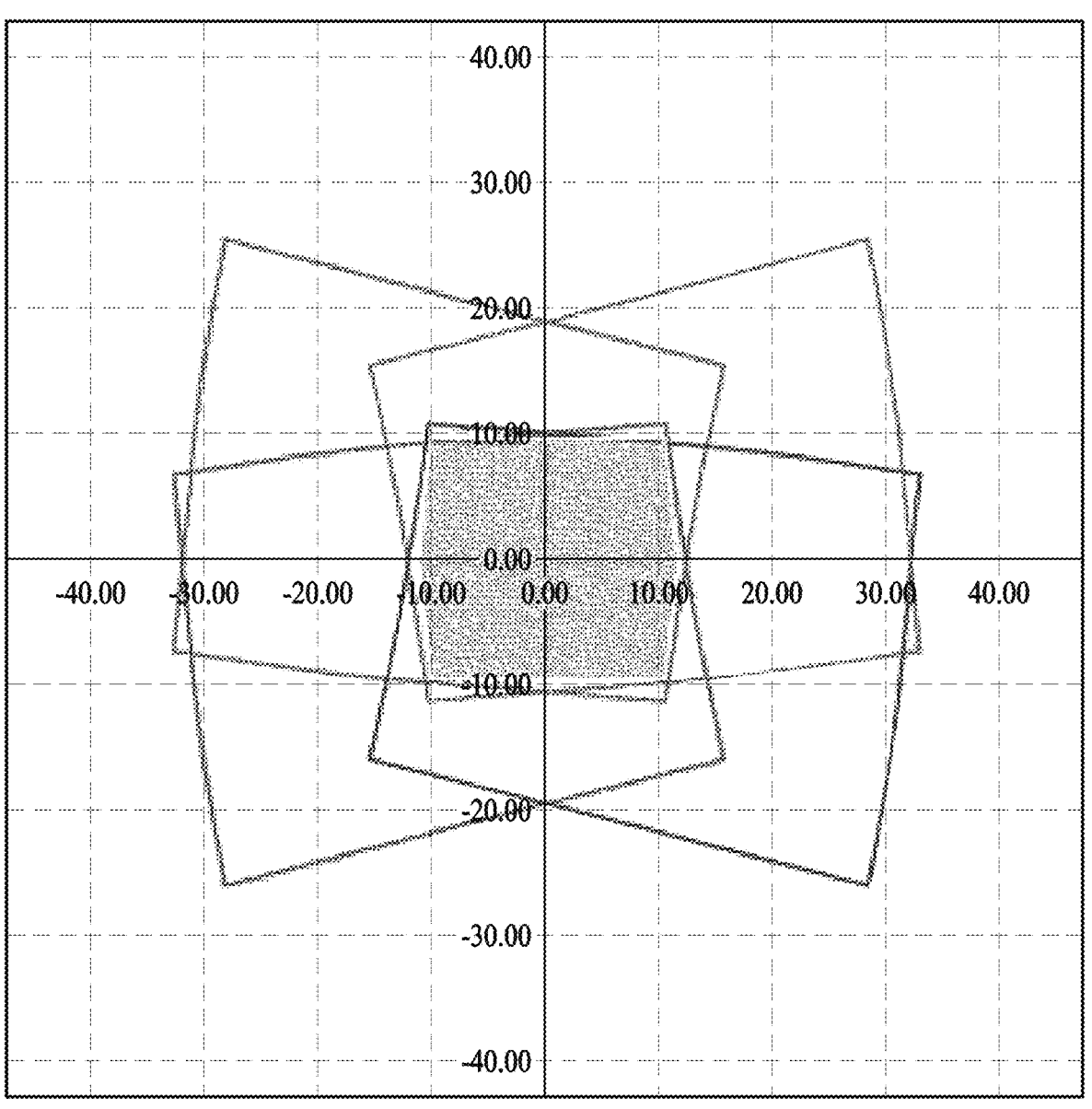
FIG. 6 illustrates an example of a mixed mode of image generation from FOV channels of lens assemblies included in an array of lens assemblies each having a double-folded optical axis.

FIG. 6 illustrates a so-called mixed imaging mode that is implemented in one or more non-limiting examples. For it to be possible to implement this mode, the input optical axis folding element 1 of each of the lens assemblies may need to tilt about either one or both of an x-axis and a z-axis at a predetermined transitional angle so that image portions of the FOV channels of the lens assemblies positioned in a central portion of an image sensor plane at least partially overlap. For the central portion (a shaded area in FIG. 6), the above-described image combining algorithm may be used, resulting in super-resolution. For other portions in which the FOV channels at least partially overlap, the above-described image stitching algorithm may be used.

Figure 7:
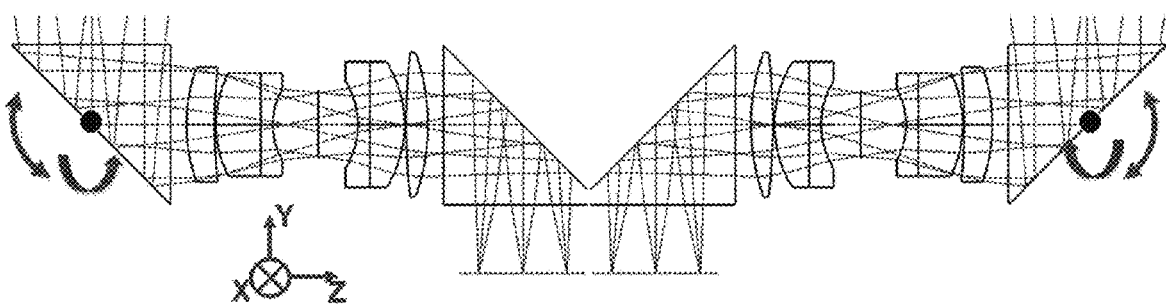
FIG. 7 schematically illustrates an example of an array of lens assemblies each having a double-folded optical axis having designated tilting points at which input optical axis folding elements tilt about either one or both of an x-axis and a z-axis.

FIG. 7 schematically illustrates an example of two lens assemblies from an array of lens assemblies each having a double-folded optical axis. In this example, bold points may schematically designate points at which the input optical axis folding elements may tilt about an x-axis and a z-axis. An additional mechanism (not shown) may be used to tilt the input optical axis folding elements about the x-axis and the z-axis. As known to those skilled in the art, any kind of actuator, such as a magnetic actuator or an electrostatic mechanism, which may be appropriate for such purpose, may be used. An actuator may implement tilting of the input optical axis folding elements about either one or both of the x-axis and the z-axis according to a control signal from one or more processors controlling an imaging device. The control signal may be output in response to a user input to adjust an FOV (zoom) of the imaging device to generate a partial image of an observed scene of interest to a user.

It should be noted that optical axis folding elements are parts of an optical system of the optical assembly. In various examples, the optical axis folding elements may have at least one flat surface, or at least one curved optical surface that may have its own optical power. The curved optical surface may be concave or convex.

Furthermore, in one or more examples, an optical axis folding element, more particularly an input optical axis folding element, may be a flat mirror or a prism. In one or more examples, compensation for an aberration may be further performed in the optical axis folding element.

In at least one non-limiting example, an input surface (an optical surface of a lens on which light from an observed scene is incident) of the input optical axis folding element provided in the form of a prism may be convex with a center of curvature in an area of an aperture stop. Accordingly, an aberration, such as coma, may be reduced during a design stage of an optical system.

Figure 8:
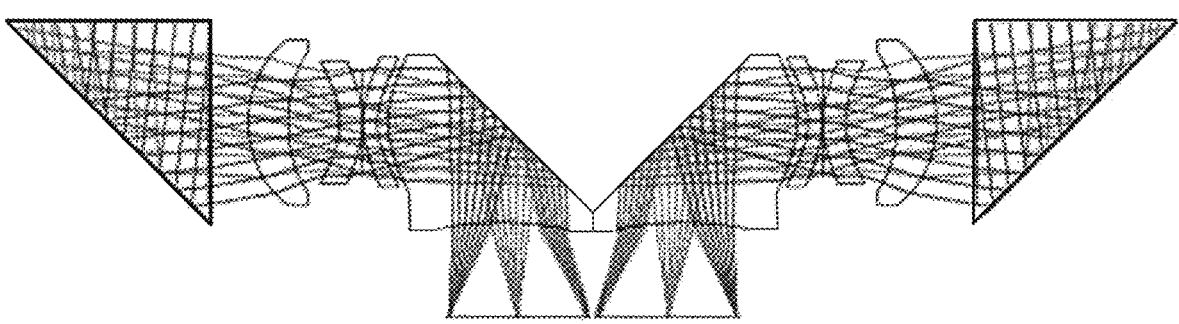
FIG. 8 schematically illustrates an example of an array of lens assemblies each having a double-folded optical axis in which output optical axis folding elements have a curved optical input surface and a curved optical output surface.

An output optical axis folding element may also have at least one curved optical surface to contribute to reducing an aberration, such as astigmatism and distortion, during the design stage of the optical system. Thus, including the optical axis folding element with a curved optical surface in the optical assembly may be advantageous in a predetermined example, since doing so may contribute to improving optical system performance, increasing resolution and reducing a number of lenses needed for the group 3 of lenses having an overall optical power by at least partially implementing aberration compensation in the optical axis folding element. As a result, for example, when an input optical axis folding element is provided in each of the lens assemblies in the form of a prism, as illustrated in FIG. 8, an optical surface of an output optical axis folding element facing a group of lenses having an overall optical power may be convex, and an optical surface of the output optical axis folding element facing an image sensor may be concave.

As described above, the array of the optical assembly may have a minimum number of lens assemblies, that is, may generate a minimum number of FOV channels, which is 2×2. The number of lens assemblies of the array may provide a minimum zoom ratio, and a resolution of a resulting image may be increased through the above-mentioned super-resolution algorithm.

Since the optical axis folding element may be tilted about an optical axis of a lens (more particularly, about either one or both of the above-described x-axis and z-axis), images of an image sensor plane, the images generated by each of the FOV channels, may respectively rotate about this channel so that overlapping areas are not uniform, which limits an FOV dimension of a resulting image in the above-described second (wide-angle) mode.

The number of lenses included in the array of lens assemblies each having the double-folded optical axis and the number of FOV channels of the image sensor plane may vary in various examples. Generally, there may be two options.

One option is to retain an aspect ratio of a frame in the above-described first and second modes.

Another option is to change the aspect ratio of the frame depending on the first and second modes.

According to the option of retaining the aspect ratio, the array of lens assemblies may include lens assemblies that generate 2×2, 2×3, 3×2, or 3×3 FOV channels in the image sensor plane.

For example, in a case of 2×3 or 3×2 channels in the image sensor plane, images corresponding to 6 FOV channels may be generated in the image sensor plane. The FOV channels may have different respective tilt amounts (angles) of the input optical axis folding elements, which may allow a wide FOV to be implemented in a resulting image of the image sensor.

Figure 9:
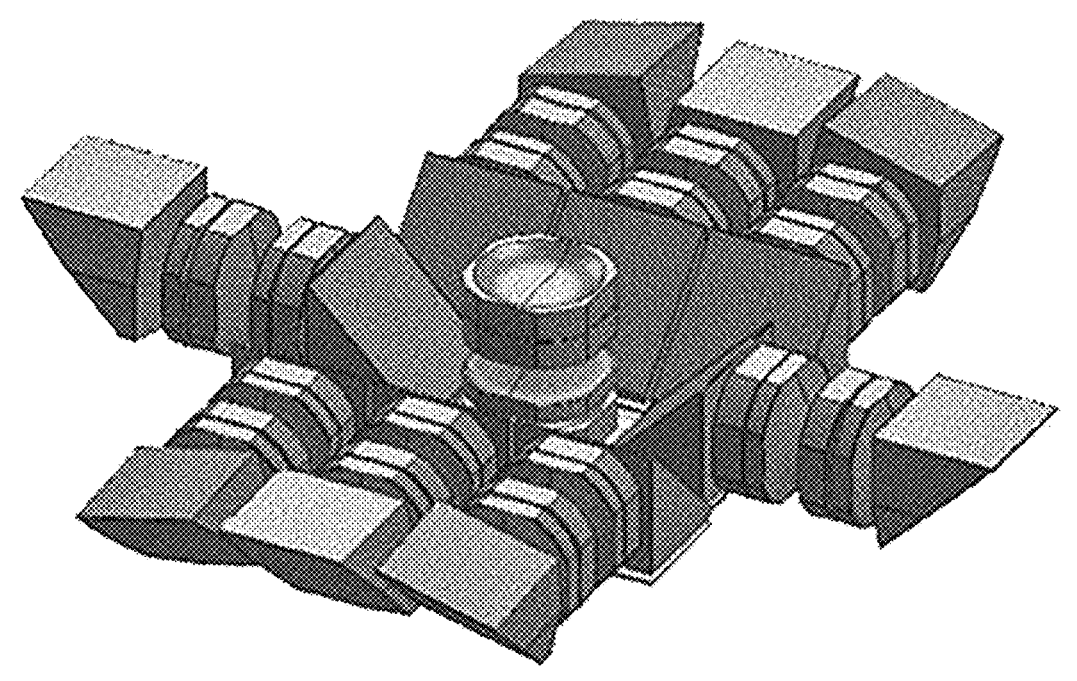
FIG. 9 illustrates an example of an optical assembly including a 3×3 array of assemblies in which all of the lens assemblies have a double-folded optical axis except for a central lens assembly.

In a case of a 3×3 configuration of the array of lens assemblies each having the double-folded optical axis, 9 FOV channels may be generated in the image sensor plane. The FOV channels may have respective different tilt amounts (angles) of the input optical axis folding elements, and may be combined to provide a resulting image with a wide FOV. In a configuration illustrated in FIG. 9, a central lens assembly of the 3×3 array of assemblies may not be a lens assembly having a double-folded optical axis because there is no room in the array for the central lens assembly to accommodate the input and output optical axis folding element included in the other lens assemblies having the double-folded optical axis, the structure of which is described above.

According to the option of changing the aspect ratio, when there is no limitation on the aspect ratio of the image frame, an example of an array of lens assemblies having a different configuration of FOV channels may be provided.

A 1×N (1×3, 1×4, etc.) configuration of lens assemblies may be provided. In this configuration, N lens assemblies may be arranged so that their output optical axis folding elements are arranged facing the image sensor plane in one row. The lens assemblies may have different respective tilt amounts (angles) of the input optical axis folding elements, and accordingly a wide FOV may be implemented in the resulting image in the image sensor.

A 2×N configuration of lens assemblies may be provided. In this configuration, 2N lens assemblies may be arranged so that their output optical axis folding elements are arranged facing the image sensor plane in two rows. The lens assemblies may have different respective tilt amounts (angles) of the input optical axis folding elements, and accordingly a wide FOV may be implemented in the resulting image in the image sensor.

When an array of lens assemblies in which the lens assemblies are arranged in three or more rows is used, a situation that is the same as the one described above with respect to the example of the 3×3 configuration of the array of lenses may be occur, that is, a situation in which there is no room between a first line of the array and a last line of the array to accommodate a lens assembly including a double-folded optical axis for a central FOV channel may be occur.

In one or more non-limiting examples, instead of by mechanical movement (tilting about either one or both of the x-axis and the z-axis) of the input optical axis folding element, changing a direction (tilt angle) of each FOV channel may be implemented using a nematic liquid crystal (NLC) light deflector.

The NLC light deflector may include an NLC material and an optical polymer having a refraction index similar to a refractive index of the NLC material. In this example, changing the tilt angle of each FOV channel may be implemented by changing a spatial arrangement (orientation) of NLC molecules in the NLC light deflector. When longitudinal axes of the NLC molecules are parallel to a lower surface of the NLC light deflector (when no current is applied to the NLC light deflector), a maximum deflection angle may be obtained, and accordingly a wide-angle resulting FOV may be obtained. When a current is applied to the NLC light deflector, the longitudinal axes of the NLC molecules may be perpendicular to the lower surface of the NLC light deflector, and a light beam having a single polarization may be transmitted through the input optical axis folding element substantially without deflection, and accordingly a narrow-angle resulting FOV may be obtained.

Since an NLC light deflector acts on polarized light, a polarizer may need to be provided in front of the input optical axis folding element to prevent unwanted stray light from entering the optical system.

In a second aspect, an imaging method may be provided, wherein the imaging method is substantially a method of operating the optical assembly of the first aspect of the above-described disclosure. The method may include the following operations.

In an operation S1, incident light from an observed scene may be input into an array of lens assemblies each having a double-folded optical axis through input optical axis folding elements of the lens assemblies.

In an operation S2, after passing through the input optical axis folding elements where folding (reflection) of an optical axis is achieved, the light may be transmitted through at least one lens having an optical power. The at least one lens having an optical power may be a group of lenses having an overall optical power that may be configured to compensate for aberrations and other defects.

In an operation S3, after passing through the at least one lens, the light may be output onto an image sensor through an output optical axis folding element. In the output optical axis folding element, which is static, i.e., is disposed at a fixed position, in one or more examples, second folding (reflection) of the optical axis may be performed, and ach FOV channel may reach an image sensor plane.

A direction of an FOV of the input optical axis folding element may be changed by tilting the input optical axis folding element about either one or both of an x-axis and a z-axis to generate each FOV channel in the image sensor.

By arranging an array of lens assemblies that generates a narrow FOV channel substantially parallel to the image sensor plane, as well as using a lens with a two-reflected (double-folded) optical axis, a thin optical assembly may be achieved. Ultimately, a technology according to the present disclosure may allow the optical assembly to be used in a compact imaging device that may be integrated into various pieces of portable user equipment and other devices.

By virtue of a combination of FOV channels generated by the lens assemblies included in the array of lens assemblies each having the double-folded optical axis and a fact that each of the FOV channels has a low f-number, a high-resolution resulting image may be obtained.

By virtue of the fact that the input optical axis folding elements are configured to tilt about either one or both of an x-axis and a z-axis, and the fact that each of the input optical axis folding elements assumes a unique position and generates its own FOV channel each having a tilt angle and FOV that covers a respective portion of an observed scene, an FOV of a resulting image may be changed from a narrow FOV corresponding to an image captured using a zoom lens to a wide FOV corresponding to an image captured using a wide-angle lens.

Those skilled in the art will understand that what is described above and illustrated in the drawings represents only some of the examples of possible technologies, materials, and technical solutions that may be implemented in examples of the present disclosure. The detailed description of examples of the present disclosure provided above is not intended to restrict or define the legal protection scope of the present disclosure.

The technology of the present disclosure may be used in a structure of a high-resolution camera capable of changing an FOV (a focal length) for portable user equipment such as a smartphone, a tablet computer, a portable computer, and a laptop. Moreover, the technology of the present disclosure may be used in any other device including a compound high-resolution camera capable of changing an FOV (a focal length).

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical assembly of an imaging device, the optical assembly comprising:

an array of lens assemblies each having a double-folded optical axis; and a single common image sensor, wherein each of the lens assemblies, each having the double-folded optical axis, comprises an input optical axis folding element, at least one lens having an optical power, and an output optical axis folding element, wherein the input optical axis folding element of each of the lens assemblies, each having the double-folded optical axis, is configured to change a field of view (FOV) of the input optical axis folding element by changing an optical axis folding angle of the input optical axis folding element about two axes, wherein the input optical axis folding element is configured to rotate about a first axis, and a second axis perpendicular to the first axis, and the output optical axis folding element is disposed at a fixed position, wherein a FOV channel is generated by light output from each of the lens assemblies in a corresponding portion of the single common image sensor, and wherein at least one output optical axis folding element of the lens assemblies has a curved optical surface.

2. The optical assembly of claim 1, wherein the at least one lens having the optical power is a group of lenses each having a respective optical power and a common optical axis.

3. The optical assembly of claim 2, wherein the single common image sensor is disposed on a plane that is substantially parallel to the common optical axis of the group of lenses.

4. The optical assembly of claim 1, wherein the array of lens assemblies each having the double-folded optical axis is a 2×2 array, and wherein each of the lens assemblies each having the double-folded optical axis is disposed so that an output surface of the output optical axis folding element faces the single common image sensor.

5. The optical assembly of claim 1, wherein each of the input optical axis folding element and the output optical axis folding element comprises a prism or a flat mirror.

6. The optical assembly of claim 1, wherein each of the input optical axis folding element and the output optical axis folding element comprises a flat optical surface or a curved optical surface.

7. The optical assembly of claim 1, wherein the output optical axis folding element is disposed at a fixed position.

8. The optical assembly of claim 1, wherein the input optical axis folding element comprises an actuator configured to tilt the input optical axis folding element about either one or both of an x-axis and a z-axis independently to change the optical axis folding angle about the two axes.

9. The optical assembly of claim 1, wherein the at least one lens having the optical power is a group of lenses comprising one or more refractive optical elements configured to provide the optical power.

10. The optical assembly of claim 1, wherein the input optical axis folding element comprises a nematic liquid crystal (NLC) light deflector configured to change the optical axis folding angle of the input optical axis folding element about the two axes.

11. The optical assembly of claim 1, wherein the optical axis folding angle is substantially 90 degrees in each of the input optical axis folding element and the output optical axis folding element.

12. An imaging method in an imaging device comprising an array of lens assemblies each having a double-folded optical axis, each of the lens assemblies comprising an input optical axis folding element, at least one lens having an optical power, and an output optical axis folding element, the imaging device further comprising a single common image sensor, the imaging method comprising:

inputting incident light from a scene to be imaged into the array of lens assemblies each having the double-folded optical axis through the input optical axis folding element of each of the lens assemblies;

transmitting the light that has passed through the input optical axis folding element of each of the lens assemblies through the least one lens having an optical power of each of the lens assemblies;

outputting the light that has passed through the at least one lens of each of the lens assemblies to the single common image sensor through an output optical axis folding element of each of the lens assemblies to generate a field of view (FOV) channel for each of the lens assemblies in the single common image sensor; and changing an optical axis folding angle of the input optical axis folding element of one or more of the lens assemblies about two axes to change the FOV of each of the one or more lens assemblies, wherein an optical axis of the incident light is folded twice by the input optical axis folding element and the output optical axis folding element of each of the lens assemblies having the double-folded optical axis, wherein the input optical axis folding element is configured to rotate about a first axis, and a second axis perpendicular to the first axis, and the output optical axis folding element is disposed at a fixed position, wherein a FOV channel is generated by light output from each of the lens assemblies in a corresponding portion of the single common image sensor, and wherein at least one output optical axis folding element of the lens assemblies has a curved optical surface.

13. The imaging method of claim 12, wherein the changing of the optical axis folding angle comprises tilting the input optical axis folding element of the one or more of the lens assemblies about either one or both of an x-axis and a z-axis independently.

14. The imaging method of claim 12, wherein the input optical axis folding element of each of the lens assemblies comprises a nematic liquid crystal (NLC) light deflector, and wherein the changing of the optical axis folding angle comprises controlling the NLC light deflector to change the optical axis folding angle of the input optical axis folding element of each of the one or more of the lens assemblies.

15. The imaging method of claim 12, further comprising partially or fully overlaying the FOV channels generated in the single common image sensor by the lens assemblies of the array of lens assemblies each having the double-folded optical axis to obtain a resulting image.

16. The imaging method of claim 12, wherein the optical axis of the incident light is changed by substantially 90 degrees by each of the input optical axis folding element and the output optical axis folding element of each of the lens assemblies.

17. An imaging device comprising:

a single common image sensor comprising an imaging surface; and an array of lens assemblies configured to form an array of images on the imaging surface of the single common image sensor, wherein at least one lens assembly of the lens assemblies comprises:

an input optical axis folding element configured to fold an optical axis of the lens assembly in a first direction;

an output optical axis folding element configured to fold the optical axis of the lens assembly in a second direction different from the first direction; and at least one lens having an optical power disposed between the input optical axis folding element and the output optical axis folding element, and the input optical axis folding element of each of the at least one lens assembly is configured to change a field of view (FOV) of the input optical axis folding element by changing an optical axis folding angle of the input optical axis folding element in two directions, wherein the input optical axis folding element is configured to rotate about a first axis, and a second axis perpendicular to the first axis, and the output optical axis folding element is disposed at a fixed position, wherein a FOV channel is generated by light output from each of the lens assemblies in a corresponding portion of the single common image sensor, and wherein at least one output optical axis folding element of the array of lens assemblies has a curved optical surface.

18. The imaging device of claim 17, wherein the input optical axis folding element comprises an input surface configured to receive incident light from a scene to be imaged by the imaging device, and an output surface facing an input surface of the at least one lens, and the output optical axis folding element comprises an input surface facing an output surface of the at least one lens, and an output surface facing the single common image sensor.

19. The imaging device of claim 17, wherein the imaging surface of the single common image sensor is substantially parallel to an optical axis of the at least one lens.

20. The imaging device of claim 17, wherein the array of lens assemblies is a 2×2 array of lens assemblies, and all of the lens assemblies of the 2×2 array of lens assemblies comprise the input optical axis folding element, the output optical axis folding element, and the at least one lens, or the array of lens assemblies is a 3×3 array of lens assemblies, all of the lens assemblies of the 3×3 array of lens assemblies except a central lens assembly among the 3×3 array of lens assemblies comprise the input optical axis folding element, the output optical axis folding element, and the at least one lens, and the central lens assembly comprises the at least one lens, but does not comprise the input optical axis folding element and the output optical axis folding element.

\* \* \* \* \*